Figure 1:
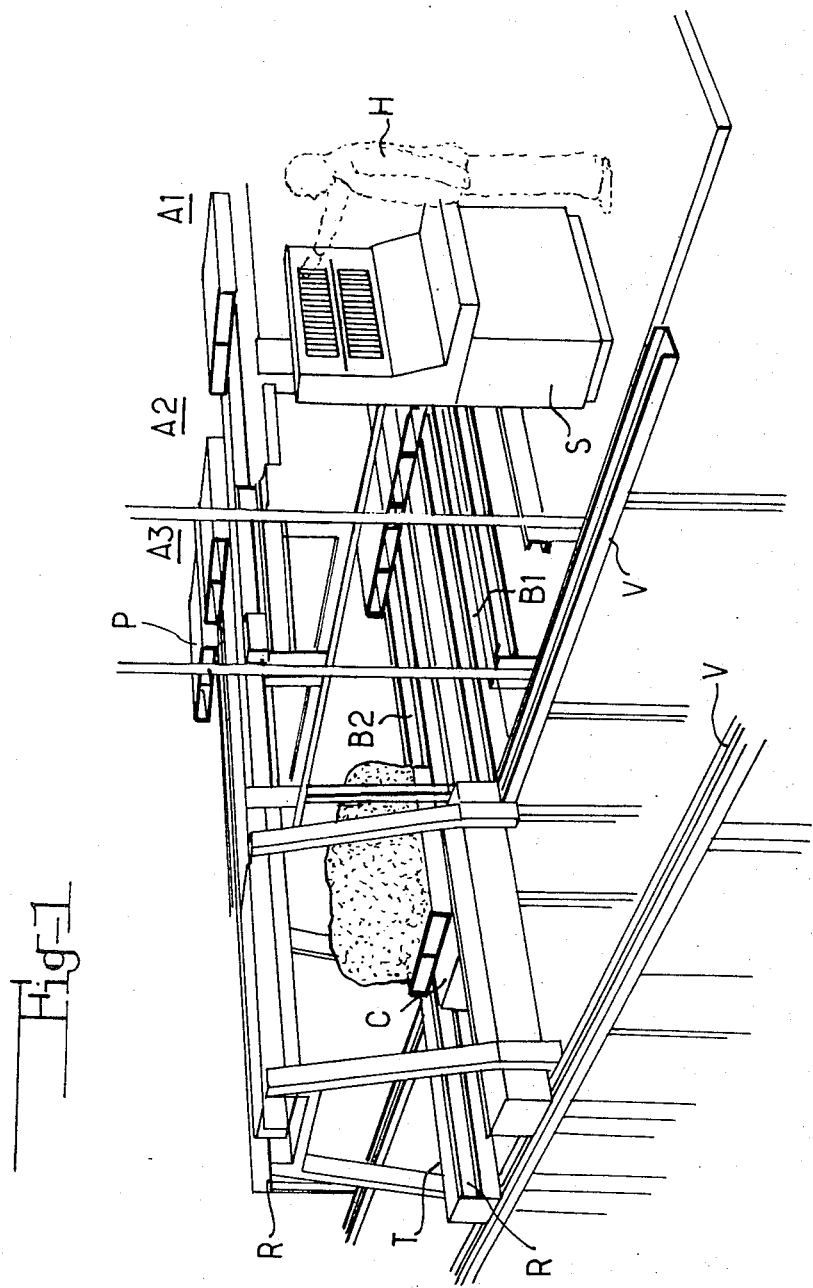

United States Patent [19]
Coppel

[11] 3,786,943
[45] Jan. 22, 1974

[54] CENTRALISED CONTROL FOR AN AUTOMATIC SYSTEM OF HANDLING PALLETS

[75] Inventor: Georges Coppel, Paris, France

[73] Assignee: Constructions Mills. K, Saint-Ouen, France

[22] Filed: Mar. 28, 1972

[21] Appl. No.: 238,771

[30] Foreign Application Priority Data
May 12, 1971 France .............................. 71.17275

[52] U.S. Cl. .......................................... 214/16.4 A
[51] Int. Cl. ............................................. B65g 1/06
[58] Field of Search ...... 214/16.4 B, 11 R, 16.4 A, 214/16 B, 16.1 CC

[56] References Cited
UNITED STATES PATENTS
3,027,022  3/1962  Peras ................................. 214/11 R
3,434,604  3/1969  Haldimann et al. ........... 214/16.4 A Primary Examiner—Gerald M. Forlenza
Assistant Examiner—R. B. Johnson
Attorney, Agent, or Firm—John W. Malley et al.

[57] ABSTRACT

A control system with memory and synoptic panel enabling an operator to prepare the movement of pallets between the passage-ways and the entrances to and exits from a storage installation.

The frame has a main and lateral channels in which slide lugs representing the handling pallets ; movement of the lugs is recorded electrically in the form of signals in the memory; the starting point and destination signals are progressively converted into commands for the motors of the transfer trolley and the automatic trolley.

Applicable to all types of storage installations on one or more levels with parallel passage-ways in which storage pallets accumulate.

9 Claims, 5 Drawing Figures

CENTRALISED CONTROL FOR AN AUTOMATIC SYSTEM OF HANDLING PALLETS

The invention concerns a centralised control station having a storage memory which, via control wires, can dispatch electrical commands to an automatic trolley operating the movement of handling pallets and can receive the controls which co-ordinate the movements. The essential part of the station, with a subsidiary group of electronically functioning components, is a synoptic indicator frame which presents the movements directly to the human operator.

Synoptic control posts with movement switches incorporated directly in the switching frames are already familiar in electric power stations. There are also combined control and signalling boards for controlling points and signals on railways. Further, indicator frames for the marshalling of goods wagons have been constructed incorporating the controlled descent of small balls representing the wagons.

The invention is a special application of this type of system for remotely effecting a series of operations involving the movement of pallets between parallel passage-ways where they are stored and between these passage-ways and the entry to or exit from a transfer gangway at right-angles to the said passage-ways. The electrical lay-out of the invention thus makes it possible to establish a programme of entry into, withdrawal from or modification to storage, this programme being stored in a memory, to be effected either in accordance with the material possibilities of movement of the automatic trolley or held in abeyance until the required juncture.

Not only does it offer this facility, but it also provides a continuous visual picture of the position of the pallets in the passage-ways and thus a representation of the stock-room.

The control centre of the invention, designed to simulate and to programme the movements of a transfer device equipped with an automatic load-carrier for the storage gangways, comprises, in combination : a frame having at least one line of parallel channels converging in a main channel at right angles thereto, the said channels being fitted with slots which open in the front of the frame in such a way as to contain a number of lugs running within the channels for passing from one to another, the main channel having at least one opening to the frame allowing the lugs to be inserted or extracted ; a number of lugs, approximately mushroom-shaped, of which the head represents the load to be transferred while the foot is fitted with an element which actuates the electrical contacts ; contacts near to the junction of the lateral channels with the main channel and also to the openings in the main channel, to control the movement of the lugs manipulated by the operator ; electromagnetic locking devices at the ends of the channels and in the openings, to prevent movement of the lugs incompatible with the actual position of the trolley or the loads ; means for recording signals resulting from movement of the lugs between the lateral channels or between them and the openings ; and means for comparing the recorded signals and the signals indicating the position and functioning of the trolley in order to co-ordinate and command the successive execution of the recorded orders.

According to a preferred embodiment, the contact devices at the junction of the lateral channels with the main channel consist of two successive switches, fitted in such a way that the sequence in which the two transit signals caused by the movement of the lug is given indicates whether it is emerging from this passage-way or entering it.

The head of the lug should preferably be rectangular, and it is designed to carry a symbol representing the nature of the load stored.

The control post will preferably be constructed in the form of a desk with a vertical front containing a frame showing the storage passage-ways and a sloping section with the operating and visual controls, the latter indicating especially the sequence of memorised signals of movements from the passage-way of departure to that of arrival.

According to a preferred embodiment, the signals given by the switches in the passage-ways, in the entrances and the exits are passed to a coding device which actuates an unblocking unit for recording alternately in two sections of the register the origin and destination of each movement, while the contents of the recording stages are progressively transferred by rhythmic impulses to a final command stage, the contents of this stage being passed to a comparative balance which in turn receives clearance from a counter indicating the position of the transfer apparatus, and the comparative balance issues signals for the forward moment, backward movement or stopping of the said apparatus.

Figure 2:
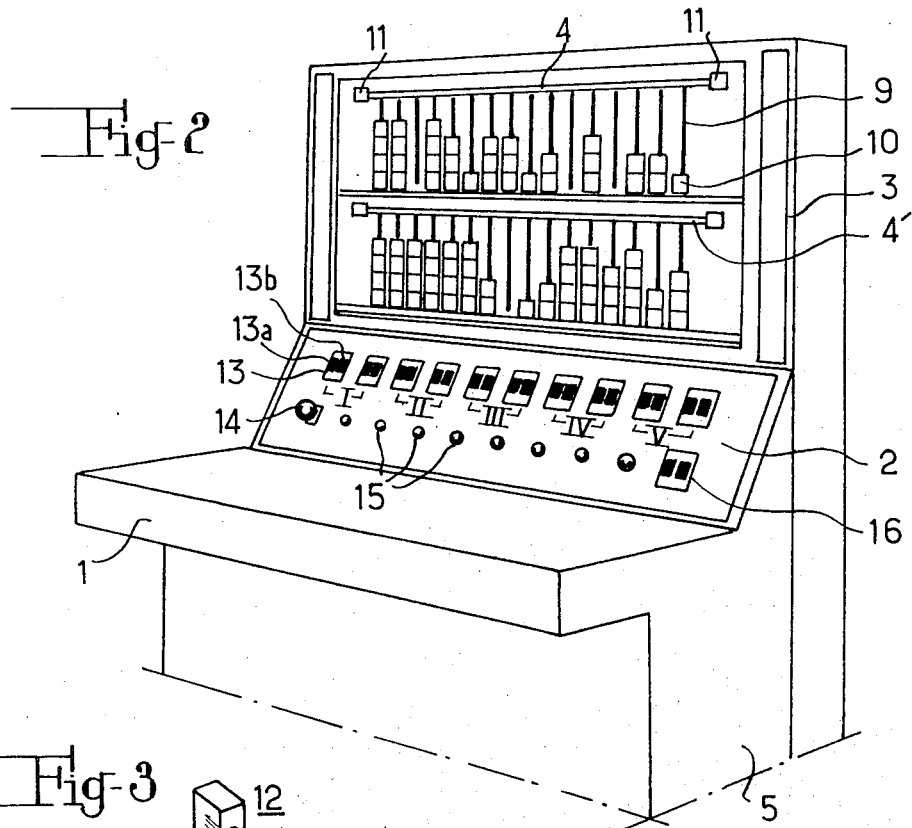
Figure 3:
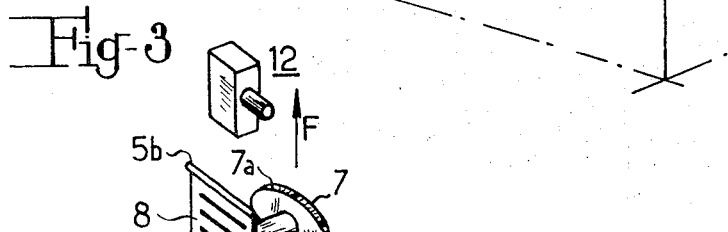
Figure 4:
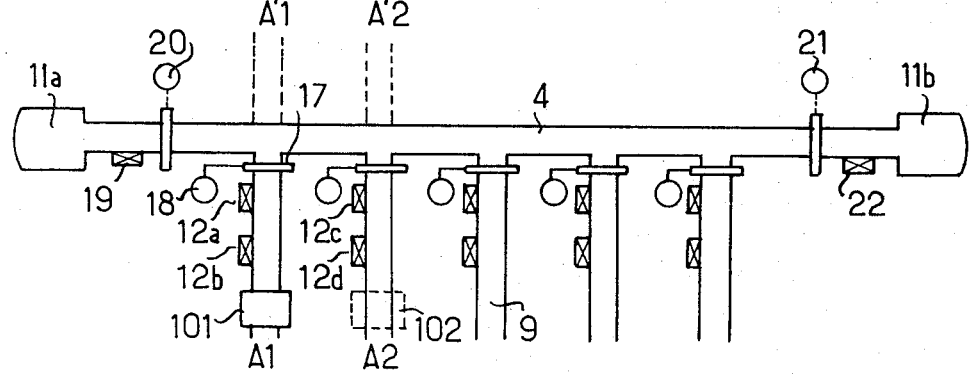
Figure 5:
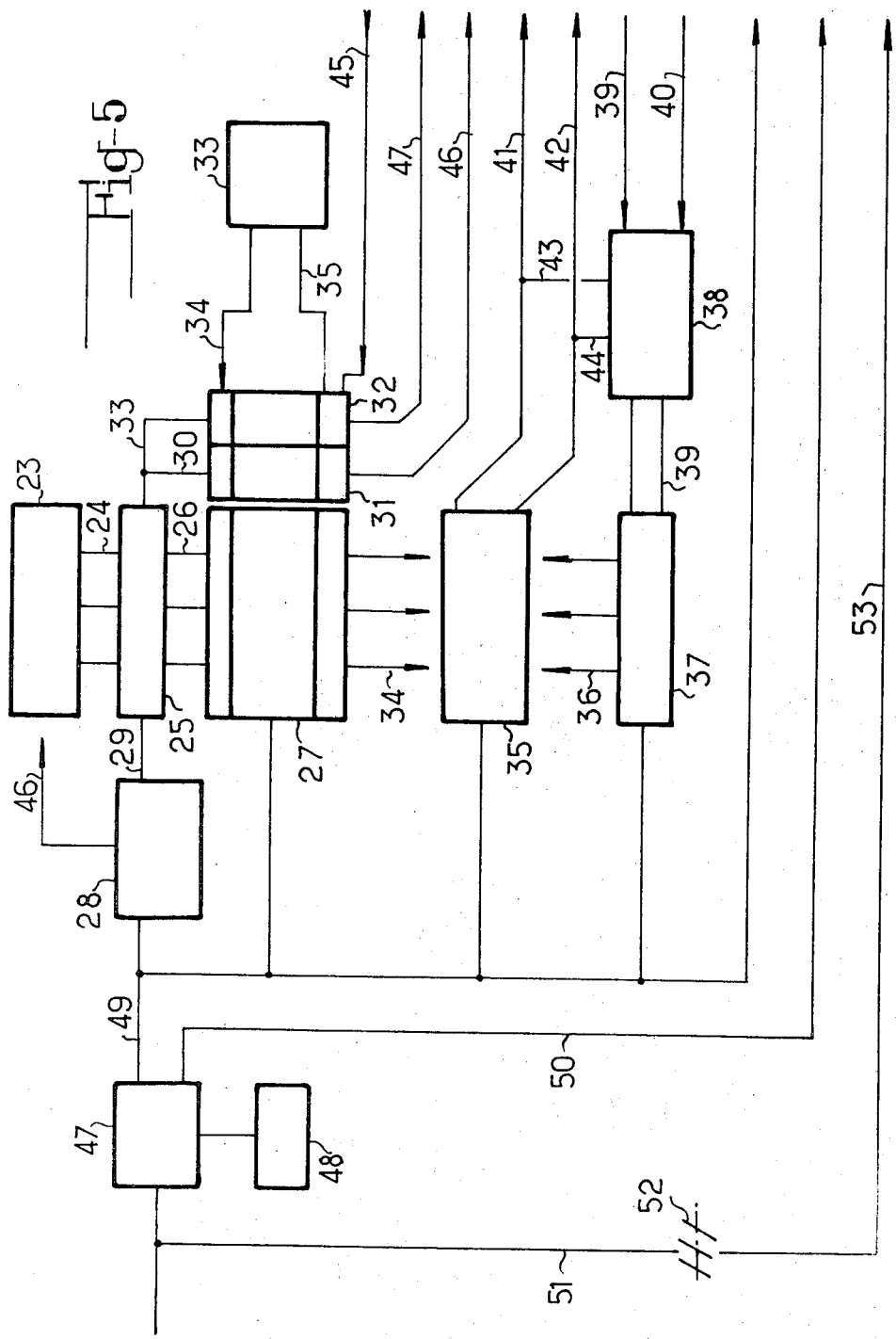

Further details and advantages will be apparent from the description which follows of one embodiment, given as an example, and referring to the attached drawings :

FIG. 1, A diagrammatic view of part of a storage installation with passage-ways for pallets, showing the central control point, FIG. 2, a view of the control console, FIG. 3, a view of a frame lug, FIG. 4, a diagram of the electrical system of the frame channels, FIG. 5, a block diagram of the registering and command switching system.

Parallel tracked passage-ways such as A1, A2, A3 on the upper level and B1, B2, etc. on the lower level make possible the positioning of storage pallets P which can accumulate one behind the other in each passage-way up to a certain capacity.

A track V at the end of the passage-ways, running at right-angles thereto, permits the movement of a transfer device T fitted on both levels with sections of rail which can be aligned with those in the passage-ways when the device T is automatically brought to a standstill.

The device T drives an automatic trolley C which runs on the rails R and also on those of the passage-ways for fetching the pallets P in their passage-way or for transferring them to another passage-way. the installation also has entry and exit doors, not shown, for supplying the installation with loaded pallets or, alternatively, for making deliveries. To one side of the stock-room, on a platform, is a central control point S handled by an operator H who can thus control the entire storage system automatically. Electrical connections are provided between the control point S, the trolley T and the trolley C for starting the motors of these units in the desired direction and for stopping them at suitable points. When, as shown in FIG. 1 on the lower level, a trolley C has moved completely on to the transfer apparatus T, it sends a signal known as "end of cycle" which permits the movement of T. This latter movement is controlled by a series of contact switches placed along the track V (not shown) for the purpose of counting progressively the number of passage-ways passed by the device T.

It will be seen from FIG. 1 that all the passage-ways are to the right of the track V, on the same side as the control point S, but the surface area available for storage can be doubled by arranging the passage-ways symmetrically in terms of the track V. In the following text, this symmetrical section has not been considered, for the sake of simplicity, the possibility thereof merely being held in reserve.

The console of the control point is shown in FIG. 2 ; its lower part, which is no more than a simple cabinet containing the electrical system, has been cut off. The upper part comprises a flat surface 1, a sloping panel 2 and a vertical panel 3, the last being man-high for ease of operation. Because of the existence of two storage levels, the panel 3 is divided horizontally into two sections. Each section has a horizontal channel 4 with a narrow open slit in the front for sliding the lugs 10 shown in FIG. 3. Each lug, somewhat resembling a mushroom in shape, consists of a snall plate 5 to hold a label, a stem 6 and a foot 7 wider than the stem. The plate 5 has a lower flange 5a and a curved upper flange 5b to grip the label 8 which displays the particulars of the goods loaded on the palled represented by the lug 10.

As will be seen from FIG. 2, the channel 4 serves as a collector for 16 vertical channels 9, which represent the storage passage-ways on one level. The channels 9 are of the same width as the channel 4, and they only allow the width of the stem 6 of the lugs 10 to pass. The variable number of lugs placed in each channel 9 represents variable number of pallets contained in a passage-way at a given moment. The total number can be increased or reduced if lugs are added to or withdrawn from the network of channels. For this purpose, the channel 41 has openings 11 at each end cut out of the front of the panel and of sufficient width to allow the foot 7 of the lug 10 to pass through. This foot 7 is wider transversely, following a projection 7a, so that, as the lug moves along the channel, the foot actuates micro-switches 12 suitably arranged as described below. FIG. 3 shows diagrammatically the action of a lug moving in the direction F on the micro-switch 12.

It will be clear that any other moving contact device could be envisaged. The micro-switch could be replaced by contact studs placed here and there in the channel, while the foot 7, of insulating material, would be fitted with a contact bridge. It would also be possible to use, as the contact device, sealed tubes with flexible magnetic foils or very small balls and to fit the foot 7 with a very small magnet. A large number of such contact devices are used in electro-magnetics. The panel 2 is fitted with two rows of control and command instruments. The first row consists of ten windows 13, each with two openings behind which illuminated figures appear ; these are the codings for the operations placed in the memory store when the operator H (FIG. 1) moves some lugs from one column to another. As there are 16 passage-ways on each level, two reference digits are required for these passage-ways. In each window, the opening 13a indicates the ten figure, and the opening 13b the unit. A movement is designated by the number of the passage-way from which a lug is removed, that is to say, the origin, plus the number of the passage-way into which this same lug is inserted, that is to say, the destination. Thus, two consecutive windows 13 are required to register a movement in the programme. As the panel has 10 windows, it follows that five movements, designated I, II, III, IV, V can be recorded in succession. The entrances and exits 11 can be coded in the same way as the passage-ways, and a movement entrance/passage-ways or passage-way/exit is thus encoded by two figures in the same manner.

The second row of the panel 2 contains control buttons 14, 15, signal lamps 15 and a window with two openings 16, similar to the previous ones, for two illuminated figures. The lamps 15 indicate to the operator the state of operation of the transfer device and of its automatic trolley, for example "forward movement" or "backward movement" of the apparatus T, loading platform of the trolley C raised or lowered, and end of cycle signal. Finally, the window 16 reproduces the indication of a counter which controls the actual location of the apparatus T along the track V in relation to the passage-ways.

FIG. 4 is a diagrammatic representation of the electro-mechanical equipment of a group of channels 4 and 9. A short distance before the junction of a channel with the channel 4, two switches 12a, 12b, (passage-way A1) or 12c, 12d (passage-way A2), and so on for the others, are arranged on the channel 9. In addition, two blocking doors 17, controlled by a coil such as 18, can block each channel 9. The doors, the purpose of which will be explained later, are electro-mechanical control locks of the type currently used in all systems of this kind ; they may each be fitted with a coil or a number of locks may be controlled by a common coil. It will also be noted that the entrance 11a is furnished with a single transit contact 19 and lock 20, and the exit 11b with a lock 21 and a control contact 22. FIG. 4 shows clearly that manual displacement of the lugs 10 from one column to another enables the orders destined for recording to be issued electrically. Let us assume a lug to be placed in 101, colum A1. Assuming the blocking devices to be open, the lug is moved to position 102 in column A2.

By a system of wiring corresponding to the switches, which it not described, signals are thus given in the sequence 12b, 12a, 12c 12d, the sequence 12b, 12a, signifying exit from A1, or the preset origin of the movement. The sequence 12c, 12d, indicates entry into A2 or the destination of the movement. The exit from a passage-way indicates unloading from the automatic device. The entrance 11a is or necessity a point of origin, as it requires only one contact 19. The exit 11b is or necessity a destination, as it requires only one contact 22.

In addition, as the frame (FIG. 2) has two zones of channels corresponding to the two levels, according to whether the movement of the lugs effects the upper channel 4 or the lower channel 4, two different signals are recorded. Finally, if, as is shown diagrammatically in FIG. 4, there are channels A'1, A'2 symmetrical with A1 and A2, the corresponding switches will give two groups of signals designated "right" or "left."

To sum up, movement of the lugs in the channels produces four groups of signals, viz.:

1. the number of the starting point and of the destination;

2. for each passage-way number, whether loading or unloading is involved;

3. on which level the movement takes place, 4. where appropriate, whether the passage-ways situated to the right or the passage-ways situated to the left of the transfer gangway are involved.

The four groups will be recorded separately and handled electronically as is described below.

In FIG. 5, block 23 represents the electrical assembly of the frame 3. The signals from the switches 12, 19, 22 passing along their respective circuits, represented by 24, arrive at a coding block 25 which interprets them.

For each point of origin and for each destination, the coding device 25 works out a tens signal 0 or 1 and one of the unit signals from 0 to 9, and these signals are transmitted along electric wires 26 to a decimal register 27 containing ten levels of decimal memories. But only the second stage is allocated to the reception of the command signals, as will be explained later. The signal to load or unload resulting from the sequence in which the two switches in one passage-way are actuated is committed to the memory in another block 28 linked by a lead 29 to the coding device 25. This latter also evaluates the binary signals "high" or "low" of the levels which, va a link 30, pass to a binary register 31 also containing 10 Stages. Finally, if the storage installation has symmetrical passage-ways A'1, A'2 (FIG. 4), there is a further 10-stage binary register 32 connected to the codind device via the lead 33.

It follows that the two registers 31 and 32 are auxiliary information storage memories which accompany the information on the points or origin and destination of the movements.

The three registers 27, 31, 32 are subjected to rhythmic impulses emanating from a clok 33 which is connected to them by leads 34. This clock can scan, that is to say, shift the stages of the registers at a rate of 1,000 periods per second, but a lead 35 connecting the clock 33 with the registers transmits a stop signal from the clock at the ninth stage of the registers while the lugs are moved between the switches, that is to say, while a unit of information is inserted into the tenth stage of the registers. If we assume the whole system to be in its initial state, containing no information, then the first nine stages of the decimal register will contain the information 0 tens, 0 units. As soon as the operation of the switches for the first movement has terminated, the clock starts up again and the code of origin applied to the tenth stage is transferred step by step to the first stage. The same applies to the binary information in the registers 31 and 32, which is similarly transferred to the delivery stage via control lines.

The first stage of the register 27 is linked via leads 34 to an electronic instrument 35 which compares the coded signals. It will be noted that the various instruments in FIG. 5 are note described in great detail, as they will be familiar to the expert. The comparator 35 is connected via a second input 36 to a counter 37 which can count the total number of passage-ways A1, A2 etc. . . , in the present example from 1 to 16. The instrument 37 can also subtract, in accordance with the position of the switch of a control instrument 38 to which it is connected by leads 39.

The counting signals are those given by contact switches placed to the righ of each passage-way on the track V each time the trolley T (see FIG. 1) passes near them. The series of signals reaches the block 38 via two conductors 39, 40, and are fed into the counter in the appropriate direction via the leads 39.

The balancing instrument 35 continuously compares its first entry 34 with its second entry 36, first by comparing the tens figure and then, after the tens have been found to be equal, the units figure. As a result, threee possible types of information can be passed via the command conductors 41, 42 to the transfer trolley : "move forward" — "move backward" — stop. Taps 43, 44 made on the commands "move forward" or "move backward" respectively permit the steering of the switch 38, which determines the direction of counting or subtracting. One very important aspect of the operation of the system in regard to the issuing of orders to move is the relative positions of the transfer device T and its automatic trolley C.

It is clear that, in the semi-engaged position shown in FIG. 1, no command to move should reach the device T. By means of switches at the normal end of travel, the loaded position of the apparatus T on the trolley C is signalled via a conductor 45 terminating in the registers. The signal means that the trolley C has completed its task of either fetching a pallet in a passage-way or of depositing it and returning to the apparatus T.

In these circumstances only the items of information from the first stage of the registers are cleared for execution. This is also true of the command signals 46 and 47 from the register 31 and 32, which indicate which trolley is to be set in motion or alternatively, in the case of an individual trolley, whether it should emerge from the apparatus T to the right or to the left. To explain the overall method of operation, it is necessary to look again at FIGS. 1 and 2. The pallets stored in the passageways A1, A2, A3, B1, B2 etc., are represented by lugs slid into the columns of the frame.

The distribution of the lugs represents the situation in the stockroom in the static condition. All previous movements having been completed, the apparatus T has been returned to its normal starting position, for example, in the entrance gangway on the switch 10. At this juncture, the decimal register is empty and all the code signals at 00. The operator can now alter the storage by making a maximum of five movements of the lugs from one column to another. But he cannot take two consecutive lugs from one and the same column, as this would mean loading two pallets simultaneously on to the apparatus T, which is impossible. The first movement of extracting a lug from a column leads, as a result of passage over the two switches, for example, 12b, 12a, to the order "load" being registered in the memory 28.

A second attempt would register two successive loading operations, and at this moment the memory 28 sends a signal along the wire which links it to the blocking devices in the frame. In this case, the blocks function and the column 9 are closed.

The blocks also prevent the preparation of other movements which the automatic equipment cannot execute. As regards the entrance 11a, opening of the block 20 is not possible unless there is in fact a pallet at this entrance and unless it is possible to insert a lug. As far as the exit 11b is concerned, the block 21 can only be unblocked if the point of exit has been cleared by a preceding pallet the blocks 20 and 21 also set up the priority of entry if an entry and an exit affect the same passage-way. As already stated, the first movement of a lug causes the clock to stop its scanning of the 9th stage of the decimal register, while the origin of this movement is recorded in the 10th stage. As soon as the lug passes beyond a switch such as 12a, the clock starts again and the information on the starting point passes from the 10th to the ninth stage, while information on the destination is recorded in the 10th stage. The operator can carry out a further operation immediately the scanning action of the clock has transmitted the data from the 10th and ninth progressively to the register as far as the second and first stages. Two possibilities are then offered by the control buttons : either to set the transfer apparatus in motion, as soon as it becomes available, to proceed to the place indicated by the first stage of the register and continuous working, or to hold it in suspense, during which time the operator can prepare up to five advance movements, each with a starting point and a destination. After that, the ten stages of the decimal register are coded an an electronic switch emits a signal which causes all the locks in the frame to drop, seeing that further preparation of movements would exceed the capacity of the memory.

During the execution of the movements stored in the memory, each first stage code is transferred to the balance 35, as soon as the apparatus T is ready for it, by sending its end of cycle signal 45, and it continues in this way to move to and from the starting point to the destination or from the previous destination to the new starting point. When the final destination reaches the first stage of the register, the remainder of which is empty, and the apparatus T is in an end of cycle position as regards the passage-way in which this destination is located, it should return automatically to its original position and stop there before a new sequence of movements can be effected, this latter measure being taken to prevent the occurence of a new order to move while the apparatus T is in motion, which would cause a fierce reversal of movement of the apparatus.

The installation possesses all the auxilary equipment usually found in automatic control systems, which does not need to be described in detail. As shown in FIG. 5, a supply pack, with regulated voltage 47, matched to a buffer accumulator 48, provides the low tension supply to the electrical equipment from a 110 V supply 50, while the circuit 51 provides, through a circuit-breaker, the mains supply for the motors of the automatic apparatus.

Numerous variations in the design are possible, both in the lay-out and importance of the storage arrangements, and in the nature of the electronic equipment such as memories, balance, counter, which can function is binary code, in binary coded decimals, etc; without departing from the scope of the invention, as defined in the appended claims.

What is claimed :

1. A centralised control station based on a synoptic panel fitted with electrical switches to simulate and programme the movements of a transfer device provided with an automatic load-carrier serving the gangways of a storage installation, said control station comprising, in combination : a frame containing at least one row of parallel channels connected to a main channel substantially at right-angles thereto, the said channels having slots opening to the front of the frame and so designed as to retain lugs which slide in the channels in order to pass from one to another, the main channel having at least one opening in the frame for the insertion or withdrawal of the lugs ; a plurality of lugs each provided with a head which represents the loads to be transferred and with a foot which is fitted with a device to actuate electrical contacts ; contact fitments close to the junction of the lateral channels with the main channel and also to the openings in the main channel for controlling the movement of lugs manipulated by an operator ; electro-magnetic locking devices at the ends of the channels and at the openings, to prevent movements of the lugs which are not compatible with the actual position of the load-carrier of the loads ; means for recording signals resulting from manipulation of the lugs between the lateral channels and between them and the openings ; and means for comparing the recorded commands and the positional and functional signals of the transfer device in such a way as to coordinate and to command the successive execution of the recorded commands.

2. A control station in accordance with claim 1, characterized by the fact that the contact devices at each junction of the lateral channel with the main channel consist of two successive switches such that the sequence of two transit signals caused by the movement of a lug indicates whether it is emerging from or entering a passage-way.

3. A control station in accordance with claim 1 characterized by the fact that the lugs have a rectangular head designed to carry a detachable symbol indicating the nature of the load stored.

4. A control station in accordance with claim 1, characterized by the fact that it is constructed in the form of a console with a vertical panel having a frame representing the storage passage-ways and with a section containing the control instruments and visual indicators which display in particular the sequence of information fed into the memory on the movements from the passage-way in which the movement starts to that in which it finishes.

5. A control station in accordance with claim 1, characterized by the fact that the signals emanating from switches in the passage-ways, the entrances and the exits are transmitted via a system of coding which feeds a decoding register for the alternative recording in two parts of the register of the origin and destination of each movement, while the contents of the stages of the register are progressively transferred by rhythmic impulses to a final command stage, the content of this stage being passed to a comparative balance which also receives clearance from a counter the function of which is to present at any given moment the position of the transfer device, and while the comparison of the balance gives rise to signals ordering the forward movement, backward movement or stoppage of the said device.

6. A control station in accordance with claim 4, characterized by the fact that the storage layout includes two levels of passage-ways served by a single transfer apparatus, that the synoptic frame includes two groups of channels corresponding to the levels, that a binary memory records the stage selected for each movement and that the binary memory is shifted and transferred in the same rhythm as the movements register, the final stages of the said memory setting in motion the automatic trolley located on the level in question.

7. A control station in accordance with claim 5, characterized by the fact that the storage system has storage passage-ways on both sides of the transfer track, that a binary memory registers, for each intended movement, with the right-hand or the left-hand side of the installation to which the automatic load-carrier should proceed on emerging from the transfer track, that the binary memory is shifted and transferred in the same rhythm as that of the movements register and that the final stage of the said memory provides a right or left signal to the motor of the automatic trolley.

8. A control station in accordance with claim 5, characterized by the fact that the transfer apparatus is fitted with a device to control the position of the automatic load-carrier at the end of its run on the said transfer, this control device giving a signal which unblocks the clearance of the command stage of each memory.

9. A control station in accordance with claim 1, characterized by the fact that the direction of movement past two successive switches produces a signal to load or to unload which is recorded in a memory, this latter being connected to a frame blocking device in order to prevent the consecutive insertion or withdrawal of two lugs for one passage-way.

* * * * *